(12) United States Patent
Osaki et al.

(10) Patent No.: US 9,290,396 B2
(45) Date of Patent: Mar. 22, 2016

(54) LIQUID TREATING METHOD

(75) Inventors: Soichiro Osaki, Kanagawa (JP); Yuji Mizuno, Kanagawa (JP)

(73) Assignee: KABUSHIKI KAISHA NIKUNI, Kanagawa (JP)

( * ) Notice: Subject to any disclaimer, the term of this patent is extended or adjusted under 35 U.S.C. 154(b) by 222 days.

(21) Appl. No.: 13/992,223

(22) PCT Filed: Jan. 19, 2011

(86) PCT No.: PCT/JP2011/050838
§ 371 (c)(1),
(2), (4) Date: Jun. 6, 2013

(87) PCT Pub. No.: WO2012/077358
PCT Pub. Date: Jun. 14, 2012

(65) Prior Publication Data
US 2013/0256924 A1    Oct. 3, 2013

(30) Foreign Application Priority Data

Dec. 6, 2010    (JP) ................................ 2010-271429

(51) Int. Cl.
*C02F 1/72*    (2006.01)
*B01F 3/04*    (2006.01)
(Continued)

(52) U.S. Cl.
CPC ............... *C02F 1/72* (2013.01); *B01F 3/04609* (2013.01); *B01F 3/04737* (2013.01);
(Continued)

(58) Field of Classification Search
CPC ........ C02F 1/72; C02F 1/74; C02F 2103/002; C02F 2103/005; C02F 1/685; B01F 3/04737; B01F 3/04609; B01F 5/106; B01F 5/108; B01F 7/168; B01F 7/22; B01F 2003/04872; B01F 2003/04893

USPC ....................... 261/27, 31, 36.1, 87
See application file for complete search history.

(56) References Cited

U.S. PATENT DOCUMENTS 3,920,550 A * 11/1975 Farrell et al. ..................... 210/86
4,207,275 A * 6/1980 Stanton, Jr. ......... B01F 3/04262
210/221.2

(Continued)

FOREIGN PATENT DOCUMENTS

GB        1356295 A    6/1974
JP        47-011462 A    6/1972

(Continued)

OTHER PUBLICATIONS

International Search Report and Written Opinion, dated Apr. 12, 2011, which issued during the prosecution of International Patent Application No. PCT/JP2011/050838, of which the present application is the national phase.
Extended European Search Report dated Oct. 22, 2015, issued in corresponding European Patent Application No. 11846534.3.

*Primary Examiner* — Thomas Bennett McKenzie
(74) *Attorney, Agent, or Firm* — Troutman Sanders LLP

(57) ABSTRACT

A liquid treating device includes a liquid guide cylinder having liquid suction and ejection ports, a liquid supply unit that supplies liquid to the liquid suction port, a pumping-up unit that is provided within the liquid guide cylinder and suctions liquid from the liquid suction port and ejecting liquid from the liquid ejection port, a liquid ejection space part that enlarges liquid, which has been ejected from the liquid ejection port by the pumping-up unit, in an upper part of a closed tank, a gas supply unit that supplies gas in the liquid ejection space part under pressure, a reflux passage that circulates liquid from the liquid ejection space part through space between the tank and the liquid guide cylinder to a lower part of the liquid guide cylinder, and treated liquid taking-out piping that takes out treated liquid from a lower part of the tank to an exterior.

4 Claims, 2 Drawing Sheets

(51) Int. Cl.
*B01F 5/10* (2006.01)
*B01F 7/16* (2006.01)
*B01F 7/22* (2006.01)
*C02F 1/68* (2006.01)
*C02F 1/74* (2006.01)
*C02F 103/00* (2006.01)

(52) U.S. Cl.
CPC ............... *B01F 5/106* (2013.01); *B01F 5/108* (2013.01); *B01F 7/168* (2013.01); *B01F 7/22* (2013.01); *B01F 2003/04872* (2013.01); *B01F 2003/04893* (2013.01); *C02F 1/685* (2013.01); *C02F 1/74* (2013.01); *C02F 2103/002* (2013.01); *C02F 2103/005* (2013.01)

(56) References Cited

U.S. PATENT DOCUMENTS

| | | | | |
|---|---|---|---|---|
| 4,457,877 A | * | 7/1984 | Love et al. | 261/64.3 |
| 6,585,236 B2 | * | 7/2003 | Tanabe et al. | 261/91 |
| 2005/0279713 A1 | * | 12/2005 | Osborn et al. | 210/760 |

FOREIGN PATENT DOCUMENTS

| | | |
|---|---|---|
| JP | 1976/100097 A | 2/1978 |
| JP | 8-309172 A | 11/1996 |
| JP | 2002-001379 A | 1/2002 |
| JP | 2002-086183 A | 3/2002 |
| JP | 2006-116288 A | 5/2006 |
| JP | 2010-247121 A | 11/2010 |

* cited by examiner

LIQUID TREATING METHOD

CROSS-REFERENCE TO RELATED APPLICATIONS

This is a U.S. national phase application under 35 U.S.C. §371 of International Patent Application No. PCT/JP2011/050838, filed Jan. 19, 2011, and claims priority to Japanese Patent Application No. 2010-271429, filed Dec. 6, 2010. The International Application was published on Jun. 14, 2012 as International Publication No. WO 2012/077358 under PCT Article 21(2). The entire contents of these applications are hereby incorporated by reference.

TECHNICAL FIELD

The present invention relates to a liquid treating device to be used at a sewage treatment plant, a bathhouse or the like.

BACKGROUND

A liquid treating device for supplying air or oxygen into liquid in an aeration bath from a blower or an oxygen supply source at the time of aeration treatment of liquid such as activated sludge water has been known (see Patent Literature 1, for example).

CITATION LIST

Patent Literature

PLT 1: Japanese Laid-Open Patent Publication No. 2002-86183

However, referring to such a liquid treating device, a large amount of air or oxygen is discharged from an aeration bath opened to the atmosphere and therefore it is impossible to dissolve oxygen in liquid in the aeration bath efficiently.

The present invention has been accomplished in view of such a problem, and it is an aspect of the present invention to provide a liquid treating device having high dissolution efficiency, which can dissolve gas in liquid to be treated efficiently.

SUMMARY

An example of the present invention includes a liquid treating device having a closed tank, a liquid guide cylinder which is placed in the closed tank in a vertical direction and has a liquid suction port opened at a lower end and a liquid ejection port opened at un upper end, a liquid supply unit that supplies liquid to be treated to the liquid suction port of the liquid guide cylinder, a pumping-up unit that is provided within the liquid guide cylinder, suctions liquid from the liquid suction port, and ejects liquid from the liquid ejection port, a liquid ejection space part that enlarges liquid, which has been ejected from the liquid ejection port of the liquid guide cylinder by the pumping-up unit, in an upper part of the closed tank, a gas supply unit that supplies gas to be dissolved in the liquid ejection space part under pressure, a reflux passage that circulates liquid from the liquid ejection space part through space between the closed tank and the liquid guide cylinder to a lower part of the liquid guide cylinder, a gas-liquid separation bath that is formed in the closed tank and at a lower side than the liquid suction port of the liquid guide cylinder, separates out gas, which has not been dissolved in liquid, from liquid, and suctions the gas to the liquid guide cylinder together with liquid, and treated liquid taking-out piping that has a liquid taking-out port opened at a lower part of the gas-liquid separation bath in the closed tank and takes out treated liquid, in which gas is subjected to dissolution treatment, from a lower part of the closed tank to the exterior.

In another aspect of the example of the present invention, the gas supply unit has a plurality of sets of gas supply piping that is connected with a plurality of gas supply sources and supplies a plurality of types of gas, and gas supply valves for the plurality of types of gas, which are respectively provided in the plurality of sets of gas supply piping to be freely opened and closed.

In yet another aspect of the example of the present invention, the liquid treating device further includes a liquid level sensor that detects a liquid level in the closed tank, a control unit that opens a gas supply valve when the liquid level detected by the liquid level sensor is higher than a set value and closing a gas supply valve when the liquid level is lower than a set value, a liquid supply pump that supplies liquid to be treated into the closed tank, a pressure sensor that detects a pressure in the closed tank, and a pump controller that variably controls a flow rate discharged from the liquid supply pump in such a manner that a pressure in the closed tank detected by the pressure sensor is maintained constant.

In a further aspect of the example of the present invention, the gas supply unit has gas supply piping for compressed air connected with a compressed air supply source, which supplies compressed air, a gas supply valve for compressed air, which is provided in the gas supply piping for compressed air to be freely opened and closed, gas supply piping for carbon dioxide gas connected with a carbon dioxide gas supply source, which supplies carbon dioxide gas, and a gas supply valve for carbon dioxide gas, which is provided in the gas supply piping for carbon dioxide gas to be freely opened and closed.

In yet a further aspect of the example of the present invention, the liquid treating device further includes a treated liquid taking-out valve that is provided in the treated liquid taking-out piping for taking out treated liquid from a lower part in the closed tank to an external bath to be freely opened and closed, a depressurizing valve that is provided at an upper part of the closed tank and depressurizes the inside of the closed tank, and a control unit that stops the liquid supply pump and the pumping-up unit and opens the depressurizing valve in a state where the treated liquid taking-out valve is closed so as to depressurize the inside of the closed tank, and then opens the treated liquid taking-out valve so as to take out carbon dioxide gas solution in the closed tank to the external bath.

In the example of the present invention, liquid to be treated which has been supplied from the liquid supply unit to the liquid suction port of the liquid guide cylinder placed in the closed tank is raised by the liquid guide cylinder and the pumping-up unit and is ejected from the liquid ejection port of the liquid guide cylinder to the liquid ejection space part, gas supplied under pressure by the gas supply unit is mixed and stirred with liquid which has expanded and jetted in the liquid ejection space part at this time, gas in a pressurized state is dissolved in liquid in the liquid ejection space part and at the reflux passage between the closed tank and the liquid guide cylinder, and treated liquid including gas dissolved therein is taken out from a lower part of the closed tank to the exterior by the treated liquid taking-out piping. Accordingly, it is possible to provide a lean liquid treating device having high dissolution efficiency, which can dissolve gas in liquid to be treated in the closed tank efficiently. Particularly, the gas-liquid separation bath is formed between the liquid suction port of the liquid guide cylinder in the closed tank and the liquid taking-out port of the treated liquid taking-out piping.

Accordingly, it becomes possible to separate out gas, which is mixed in a bubble state without dissolving in liquid, at the gas-liquid separation bath and dissolve the gas again in the closed tank in a pressurized state, and it is possible to take out only treated liquid, in which gas has been dissolved efficiently, from the liquid taking-out port of the treated liquid taking-out piping to the exterior. Moreover, there is no need to place a gas-liquid separation bath at the exterior of the closed tank and therefore the entire liquid treating device can have a compact form.

In the another aspect of the example, gas to be dissolved is supplied to the liquid ejection space part in the closed tank under pressure by the gas supply valves for a plurality of types of gas, which are respectively provided in a plurality of sets of gas supply piping to be freely opened and closed. Accordingly, a common closed tank can be used to efficiently dissolve a plurality of types of gas in liquid to be treated selectively or simultaneously.

In the yet another aspect of the example, the liquid level in the closed tank is controlled by controlling open/close of a gas supply valve with the liquid level sensor and the control unit and also the discharge flow rate from the liquid supply pump is variably controlled in such a manner that the pressure in the closed tank detected by the pressure sensor is maintained constant by the pump controller. Accordingly, gas to be dissolved and liquid to be treated can be supplied into the closed tank in a proper balance, and gas can be dissolved in liquid to be treated efficiently.

In the further aspect of the example, air or carbon dioxide gas is selected as gas to be dissolved, which is to be supplied to the liquid ejection space part in the closed tank under pressure by the gas supply unit, by the gas supply valve for compressed air provided in the gas supply piping for compressed air and the gas supply valve for carbon dioxide gas provided in the gas supply piping for carbon dioxide gas. Air or carbon dioxide gas can be dissolved in liquid to be treated efficiently, and it is possible to provide a bubble bath including microscopic bubbles or a carbonate spring.

In the yet the further aspect of the example, the control unit stops the liquid supply pump and the pumping-up unit and depressurizes the inside of the closed tank with the depressurizing valve in a static environment where the treated liquid taking-out valve is closed, and then opens the treated liquid taking-out valve so as to take out carbon dioxide gas solution in the closed tank to the external bath. Accordingly, it is possible to prevent production of a significant pressure difference at the time of taking-out of carbon dioxide gas solution in the bath, to prevent a rapid outgassing phenomenon of carbon dioxide gas from carbon dioxide gas solution due to a rapid pressure change, to supply carbon dioxide gas solution having a highly dissolved carbon dioxide gas concentration to an external bath, and to realize a highly-concentrated carbonate spring.

DETAILED DESCRIPTION

Hereinafter, the present invention will be described in detail with reference to an example illustrated in FIGS. 1 and 2.

Figure 1:
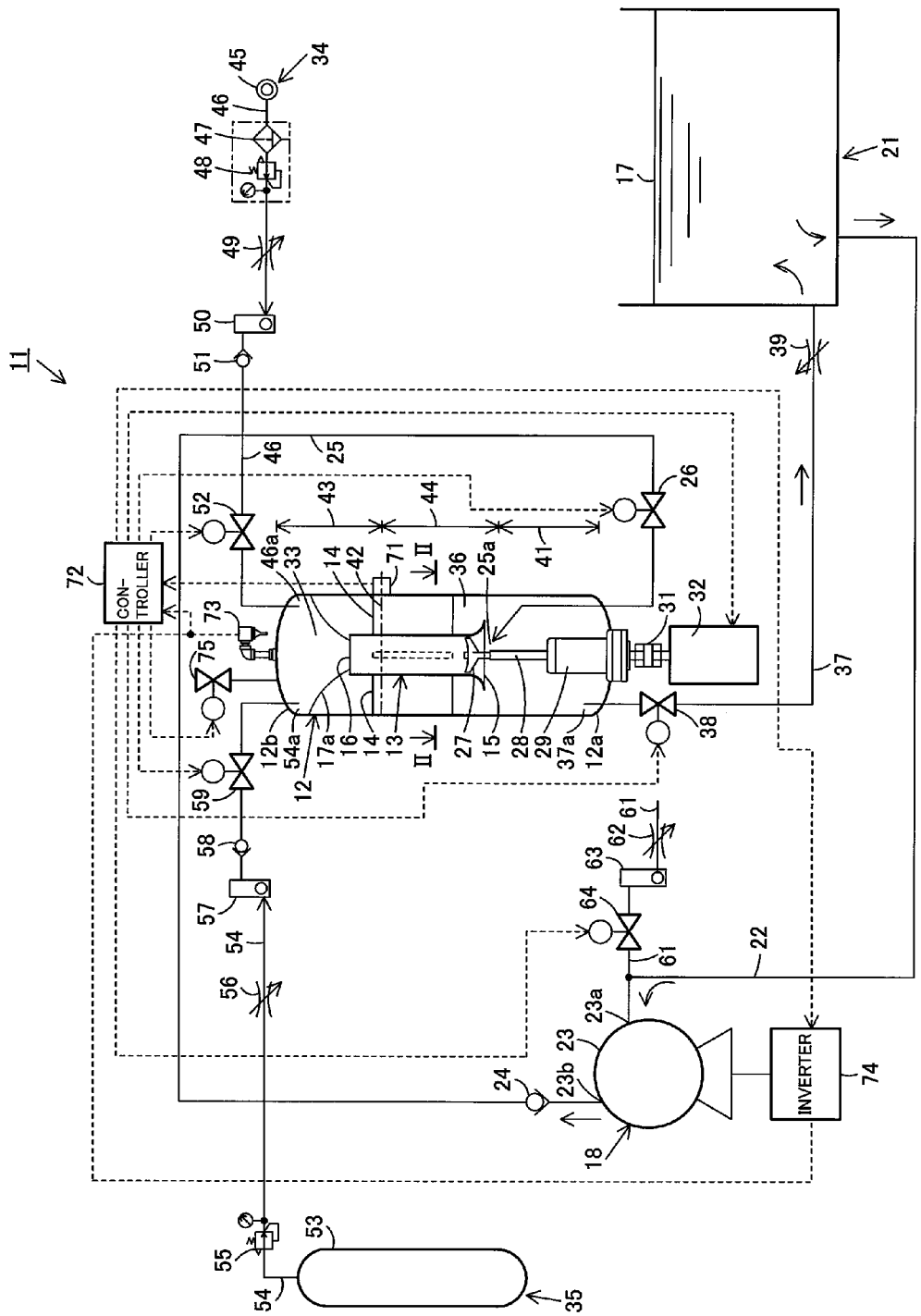
FIG. 1 is a sectional view of a main part and a piping diagram for illustrating an embodiment of a liquid treating device according to the present invention.

FIG. 1 gives a complete view of a liquid treating device 11, which is composed mainly of a cylindrical closed tank 12 having a spherical tank bottom part 12a and a tank canopy part 12b.

Figure 2:
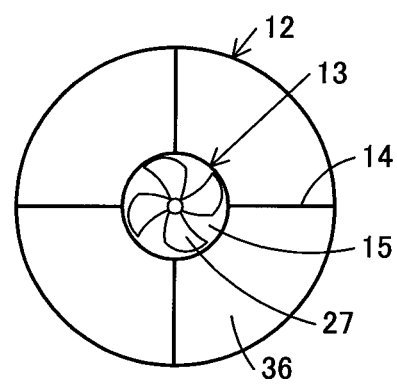
FIG. 2 is a sectional view along the line II-II in FIG. 1.

In the closed tank 12, a liquid guide cylinder 13 having openings at the upper and lower ends is placed in the vertical direction, and is supported immovably by support plates 14 arranged in a cross shape in a horizontal section as illustrated in FIG. 2. A liquid suction port 15 enlarged in a horn shape is opened at the lower end of the liquid guide cylinder 13, and a liquid ejection port 16 is opened at the upper end of the liquid guide cylinder 13.

A liquid supply unit 18 for supplying liquid 17 to be treated to the liquid suction port 15 of the liquid guide cylinder 13 is provided. Regarding the liquid supply unit 18, piping 22 extended from a bottom part of an external bath 21 storing liquid 17 is connected with a pump suction port 23a of a liquid supply pump 23 such as a vortex pump, a pump discharge port 23b of the liquid supply pump 23 is connected with liquid supply piping 25 through a check valve 24, an electromagnetic liquid supply valve 26 to be opened and closed by electrical control is provided in the liquid supply piping 25, and a liquid supply port 25a of the liquid supply piping 25 is opened at the lower side of the liquid suction port 15 of the liquid guide cylinder 13.

Within the liquid guide cylinder 13, a screw type pumping-up unit 27 for suctioning liquid 17 from the liquid suction port 15 and ejecting liquid 17a from the liquid ejection port 16 is provided, and a rotation shaft 28 of the screw type pumping-up unit 27 is held rotatably by a liquid-tight bearing 29 provided at the tank bottom part 12a of the closed tank 12 and is coupled with a rotation shaft of an electric motor 32 arranged immovably at the exterior via a coupling 31.

A liquid ejection space part 33 for enlarging liquid 17a, which has been ejected from the liquid ejection port 16 of the liquid guide cylinder 13 by the pumping-up unit 27, in an upper part of the closed tank 12 is formed between the tank canopy part 12b of the closed tank 12 and the liquid ejection port 16 of the liquid guide cylinder 13.

The liquid ejection space part 33 is connected with a gas supply unit 34 for supplying compressed air under pressure as gas to be dissolved and with a gas supply unit 35 for supplying carbon dioxide gas under pressure as gas to be dissolved.

The following description will be given of a case where compressed air and carbon dioxide gas are adopted as gas, although other gasses such as hydrogen gas, oxygen gas or ozone gas can also be applied.

A reflux passage 36 for circulating ejected liquid 17a from the liquid ejection space part 33 through space between the closed tank 12 and the liquid guide cylinder 13 to a lower part of the liquid guide cylinder 13 is formed between the inner peripheral face part of the closed tank 12 and the outer peripheral face part of the liquid guide cylinder 13.

Treated liquid taking-out piping 37 for taking out treated liquid to the external bath 21 is extended from a lower part of the closed tank 12, an electromagnetic treated liquid taking-out valve 38 to be opened and closed by electrical control and a flow regulator (diaphragm resistance variable orifice) 39 are provided in the treated liquid taking-out piping 37, and a taking-out tip of the treated liquid taking-out piping 37 is connected with the bath 21 at a sewage treatment plant, a bathhouse or the like.

The liquid supply unit 18 has the liquid supply port 25a opened immediately below the liquid suction port 15 of the liquid guide cylinder 13, the treated liquid taking-out piping 37 has a liquid taking-out port 37a opened at a lower part in the closed tank 12, and the closed tank 12 has therewithin a gas-liquid separation bath 41 formed between the liquid suction port 15 of the liquid guide cylinder 13 and the liquid taking-out port 37a of the treated liquid taking-out piping 37.

In the closed tank 12, a first dissolution bath 43 is formed between the tank canopy part 12b and a tank liquid surface 42, and a second dissolution bath 44 is formed between the tank liquid surface 42 and the gas-liquid separation bath 41.

At the first dissolution bath 43, dissolution of gas in liquid 17a is promoted by gas supply under pressure into liquid 17a which has been jetted and collided with the tank canopy part 12b or the like. At the second dissolution bath 44, dissolution of gas in liquid 17a is promoted by gas supply under pressure into liquid current which has collided with the tank liquid surface 42. At the gas-liquid separation bath 41, gas, which has not been dissolved in liquid at the first dissolution bath 43 and the second dissolution bath 44, is separated out. The separated gas is suctioned to the liquid guide cylinder 13 together with liquid and is subjected again to dissolution treatment at the first dissolution bath 43 and the second dissolution bath 44.

Regarding the gas supply unit 34 of compressed air, an air filter 47, a pressure reducing valve 48, a flow regulator (diaphragm resistance variable orifice) 49, a flowmeter 50, a check valve 51 and an electromagnetic gas supply valve 52 for compressed air to be opened and closed by electrical control are respectively provided in gas supply piping 46 for compressed air connected with a compressed air supply source 45 such as an air compressor functioning as a gas supply source for supplying compressed air, and a gas supply tip part 46a of the gas supply piping 46 is inserted into the liquid ejection space part 33 of the closed tank 12.

Regarding the gas supply unit 35 of carbon dioxide gas, a pressure reducing valve 55, a flow regulator (diaphragm resistance variable orifice) 56, a flowmeter 57, a check valve 58 and an electromagnetic gas supply valve 59 for carbon dioxide gas to be opened and closed by electrical control are respectively provided in gas supply piping 54 for carbon dioxide gas connected with a carbon dioxide gas supply source 53 such as a compressed carbon dioxide gas cylinder functioning as a gas supply source for supplying carbon dioxide gas, and a gas supply tip part 54a of the gas supply piping 54 is inserted into the liquid ejection space part 33 of the closed tank 12.

The piping 22 connected with the pump suction port 23a of the liquid supply pump 23 such as the vortex pump is connected with suction piping 61, which has therein a flow regulator (diaphragm resistance variable orifice) 62, a flowmeter 63 and an electromagnetic suction valve 64 to be opened and closed by electrical control and controls the electromagnetic suction valve 64 to open when air in the atmosphere is to be mixed into liquid 17 suctioned to the liquid supply pump 23.

A liquid level sensor 71 for detecting the liquid level of the tank liquid surface 42 in the closed tank 12 is placed at a side face of the closed tank 12. Further provided is a control unit 72 such as a controller for opening the electromagnetic gas supply valve 52 for compressed air or the electromagnetic gas supply valve 59 for carbon dioxide gas when the liquid level of the tank liquid surface 42 detected by the liquid level sensor 71 is higher than a set value and closing the electromagnetic gas supply valve 52 for compressed air or the electromagnetic gas supply valve 59 for carbon dioxide gas when the liquid level of the tank liquid surface 42 is lower than a set value.

In order to control the liquid supply pump 23 such as the vortex pump for supplying liquid 17 to be treated into the closed tank 12, a pressure sensor 73 for detecting the pressure in the closed tank 12 is provided at the tank canopy part 12b of the closed tank 12, and a pump controller 74 for variably controlling a flow rate discharged from the liquid supply pump 23 in such a manner that the pressure in the closed tank 12 detected by the pressure sensor 73 is maintained constant is provided. The pump controller 74 is an inverter for controlling the rotation speed of an electric motor for driving the liquid supply pump 23.

An electromagnetic depressurizing valve 75 to be opened and closed by electrical control, which can depressurize the inside of the closed tank 12, is placed at the tank canopy part 12b of the closed tank 12.

The control unit 72 can control open/close of the electromagnetic liquid supply valve 26, the electromagnetic treated liquid taking-out valve 38, the electromagnetic gas supply valve 52 for compressed air, the electromagnetic gas supply valve 59 for carbon dioxide gas, the electromagnetic suction valve 64 and the electromagnetic depressurizing valve 75 and can also control start/stop of the electric motor for driving the liquid supply pump 23 and the electric motor 32 of the pumping-up unit 27.

Especially, for taking out carbon dioxide gas solution from the inside of the closed tank 12, the control unit 72 has functions to stop the electric motor for driving the liquid supply pump 23 and the electric motor 32 of the pumping-up unit 27 so as to make a static environment in the closed tank 12 and open the electromagnetic depressurizing valve 75 in a state where the electromagnetic treated liquid taking-out valve 38 provided in the treated liquid taking-out piping 37 is closed so as to depressurize the inside of the closed tank 12, and then open the electromagnetic treated liquid taking-out valve 38 so as to take out carbon dioxide gas solution in the closed tank 12 to the external bath 21.

Next, the operation of the embodiment illustrated in the figures will be described.

First, when the bath 21 is a bathtub of a bubble bath in which countless microscopic bubbles are blown, the gas supply unit 34 of compressed air is selected, the compressed air supply source 45 is activated and the electromagnetic gas supply valve 52 provided in the gas supply piping 46 for compressed air is opened, so that compressed air is supplied under pressure to the liquid ejection space part 33 in the closed tank 12. When the bath 21 is a bathtub of a carbonate spring, the gas supply unit 35 of carbon dioxide gas is selected and the electromagnetic gas supply valve 59 provided in the gas supply piping 54 for carbon dioxide gas connected with the carbon dioxide gas supply source 53 is opened, so that carbon dioxide gas is supplied under pressure to the liquid ejection space part 33 in the closed tank 12.

At this time, the supply pressure of compressed air and the supply pressure of carbon dioxide gas are respectively adjusted by the pressure reducing valves 48 and 55.

The control unit 72 controls open/close of the electromagnetic gas supply valve 52 or 59 on the basis of the liquid level of the tank liquid surface 42 detected by the liquid level sensor 71 so as to maintain the liquid level of the tank liquid surface 42 in the closed tank 12 approximately constant, and also controls the rotation speed of the drive motor of the liquid supply pump 23 with the pump controller 74 in such a manner that the pressure in the closed tank 12 detected by the pressure sensor 73 is adjusted to an instructed pressure so as to variably control a discharge flow rate from the liquid supply pump 23.

For example, when the liquid level of the tank liquid surface 42 detected by the liquid level sensor 71 is higher than a set value, which means a situation of insufficiency of gas, the gas supply valve 52 or 59 which is respectively provided in the gas supply piping 46 or 54 to be freely opened and closed is opened and compressed gas or carbon dioxide gas to be dissolved is supplied under pressure to the liquid ejection space part 33 in the closed tank 12, so that the liquid level is lowered to a set value.

To give another example, when the pressure in the closed tank 12 detected by the pressure sensor 73 is higher than an instructed pressure, the pump controller 74 reduces the rotation speed of the liquid supply pump 23 and decreases the discharge flow rate from the liquid supply pump 23, so that the pressure in the closed tank 12 is lowered.

In the closed tank 12, liquid 17 to be treated, which has been supplied from the liquid supply unit 18 to the liquid suction port 15 of the liquid guide cylinder 13 placed in the closed tank 12, is raised by the liquid guide cylinder 13 and the pumping-up unit 27 and is ejected from the liquid ejection port 16 of the liquid guide cylinder 13 to the liquid ejection space part 33. At this time, compressed air supplied under pressure by the gas supply unit 34 or carbon dioxide gas supplied under pressure by the gas supply unit 35 is mixed and stirred with jetted liquid 17a, which has been enlarged and expanded in the liquid ejection space part 33 and collided with the tank canopy part 12b of the closed tank 12, and is dissolved efficiently. Moreover, even when jetted liquid 17a is bounced back from the tank canopy part 12b and collides with the tank liquid surface 42, compressed air supplied under pressure by the gas supply unit 34 or carbon dioxide gas supplied under pressure by the gas supply unit 35 is mixed and stirred and is dissolved in the liquid efficiently.

That is, in the first dissolution bath 43 formed at the liquid ejection space part 33 and in the second dissolution bath 44 formed at the reflux passage 36 between the closed tank 12 and the liquid guide cylinder 13, compressed air or carbon dioxide gas in a pressurized state is mixed and stirred in the liquid and is dissolved efficiently, and this increases the dissolved gas concentration in the liquid.

Furthermore, since the gas-liquid separation bath 41 is formed between the liquid suction port 15 of the liquid guide cylinder 13 in the closed tank 12 and the liquid taking-out port 37a of the treated liquid taking-out piping 37, it becomes possible to separate out gas, which is mixed in a bubble state without dissolving in the liquid 17a, at the gas-liquid separation bath 41 and dissolve the separated gas again in the closed tank 12 in a pressurized state, and to take out only treated liquid, in which oxygen in air or carbon dioxide gas has been dissolved efficiently, from the liquid taking-out port 37a of the treated liquid taking-out piping 37 to the exterior.

The flow regulator (diaphragm resistance variable orifice) 39 variably adjusts the internal pressure of the closed tank 12 to a set pressure (e.g., 0.2 MPa) when the liquid supply pump 23 is driven at a set rotation speed, and a diaphragm resistance value obtained after the adjustment is not changed.

In the case of compressed air, the liquid supply pump 23 is continuously operated in such a manner that the internal pressure of the closed tank 12 is adjusted to the set pressure so that bubbles are blown at the flow regulator 39. In the case of carbon dioxide gas, there are the following two carbonate spring operation methods aimed at minimizing blowing at the flow regulator 39 and achieving supply to the bath 21 without causing blowing at a carbonate spring: a Carbonate Spring Operation Method for producing a carbonate spring by continuously operating the liquid supply pump 23 by an instructed pressure which adjusts the internal pressure of the closed tank 12 lower than the set pressure; and another Carbonate Spring Operation Method for producing a highly-concentrated carbonate spring by operating the liquid supply pump 23 by an instructed pressure which adjusts the internal pressure of the closed tank 12 to the set pressure.

First, for providing a bubble bath, the control unit 72 opens the gas supply valve 52 for compressed air so as to supply compressed air into the closed tank 12, drives the pumping-up unit 27 with the electric motor 32, operates the liquid supply pump 23 in such a manner that the internal pressure of the closed tank 12 is adjusted to the set pressure, and ejects air solution in the closed tank 12 from the treated liquid taking-out piping 37 to the external bath 21 at high speed by using the set pressure in the closed tank 12. By using the rapid pressure change between before and after the flow regulator 39 at this time, countless microscopic bubbles (i.e., microbubbles) are blown and generated in the bath 21, and a milky-white bubble bath (White Ion Bath: trademark) is provided.

Such a bubble bath including microscopic bubbles has effects that minus ions discharged at the time of rupture of microscopic bubbles relax the body and mind, ultrasonic waves generated at the time of rupture of microscopic bubbles promotes the circulation of blood and warms the body by massaging the whole body, and microscopic bubbles enter pores of the skin and wash away dirt from the inside of the pores.

Carbonate Spring Operation Method

For providing a carbonate spring, the control unit 72 opens the gas supply valve 59 for carbon dioxide gas so as to supply carbon dioxide gas into the closed tank 12, drives the pumping-up unit 27 with the electric motor 32, operates the liquid supply pump 23 by an instructed pressure which adjusts the internal pressure of the closed tank 12 lower than the set pressure of compressed air, and takes out carbon dioxide gas solution in the closed tank 12 from the treated liquid taking-out piping 37 to the external bath 21. Provided in such a manner is a carbonate spring that is said generally to effect health and beauty, which minimizes production of a pressure difference between before and after the flow regulator 39 at the time of taking-out of carbon dioxide gas solution to the bath, prevents a rapid outgassing phenomenon of carbon dioxide gas from carbon dioxide gas solution due to a rapid pressure change, and supplies liquid including a sufficient amount of carbon dioxide gas dissolved therein into the bath 21.

Another Carbonate Spring Operation Method

For producing a highly-concentrated carbonate spring, the control unit 72 opens the gas supply valve 59 for carbon dioxide gas in a closed state where the electromagnetic treated liquid taking-out valve 38 and the electromagnetic depressurizing valve 75 are closed so as to supply carbon dioxide gas into the closed tank 12, drives the pumping-up unit 27 with the electric motor 32, operates the liquid supply pump 23 by an instructed pressure which adjusts the internal pressure of the closed tank 12 to the set pressure equal to that of the case of compressed air, and continues operation of the liquid supply pump 23 and the pumping-up unit 27 until the amount of carbon dioxide gas dissolution reaches saturation. When the amount of carbon dioxide gas dissolution reaches saturation and the internal pressure of the tank stops decreasing, the control unit 72 which has detected the saturation with the pressure sensor 73 stops the liquid supply pump 23 and the pumping-up unit 27, opens the electromagnetic depressurizing valve 75 in a static environment where the electromagnetic treated liquid taking-out valve 38 is closed so as to depressurize the inside of the closed tank 12, and then opens the electromagnetic treated liquid taking-out valve 38 so as to take out carbon dioxide gas solution in the sealed tank 12 to the external bath 21 using only a drop between the closed tank 12 and the bath 21. Accordingly, highly-concentrated carbon dioxide gas solution is supplied into the bath 21 while minimizing production of a pressure difference between before and after the flow regulator (diaphragm resistance variable orifice) 39 at the time of taking-out of the carbon dioxide gas solution to the bath and preventing a rapid outgassing phenomenon of carbon dioxide gas from carbon dioxide gas solution due to a rapid pressure change.

Next, the effects of the example illustrated in the figures will be described.

Liquid 17 to be treated, which has been supplied from the liquid supply unit 18 to the liquid suction port 15 of the liquid guide cylinder 13 placed in the closed tank 12, is raised by the liquid guide cylinder 13 and the pumping-up unit 27 and is ejected from the liquid ejection port 16 of the liquid guide cylinder 13 to the liquid ejection space part 33, gas supplied under pressure by the gas supply units 34 and 35 is mixed and stirred with liquid 17a which has expanded and jetted in the liquid ejection space part 33 at this time, gas in a pressurized state is dissolved in liquid 17a in the liquid ejection space part 33 and at the reflux passage 36 between the closed tank 12 and the liquid guide cylinder 13, and treated liquid including gas dissolved therein is taken out from a lower part of the closed tank 12 to the exterior by the treated liquid taking-out piping 37. Accordingly, it is possible to provide a lean liquid treating device 11 having high dissolution efficiency, which can dissolve gas in liquid to be treated in the closed tank 12 efficiently.

The gas-liquid separation bath 41 is formed between the liquid suction port 15 of the liquid guide cylinder 13 in the closed tank 12 and the liquid taking-out port 37a of the treated liquid taking-out piping 37. Accordingly, it becomes possible to separate out gas, which is mixed in a bubble state without dissolving in liquid, at the gas-liquid separation bath 41 and dissolve the gas again in the closed tank 12 in a pressurized state, and it is possible to take out only treated liquid, in which gas has been dissolved efficiently, from the liquid taking-out port 37a of the treated liquid taking-out piping 37 to the external bath 21. Moreover, there is no need to place a gas-liquid separation bath at the exterior of the closed tank 12 and therefore the entire liquid treating device can have a compact form.

Gas to be dissolved is supplied to the liquid ejection space part 33 in the closed tank 12 under pressure by the electromagnetic gas supply valves 52 and 59 for a plurality of types of gas, which are provided in a plurality of sets of gas supply piping 46 and 54 to be freely opened and closed. Accordingly, a common closed tank 12 can be used to efficiently dissolve a plurality of types of gas in liquid 17a to be treated selectively or simultaneously.

The liquid level of the tank liquid surface 42 is controlled by controlling open/close of the electromagnetic gas supply valves 52 and 59 with the liquid level sensor 71 and the control unit 72, and also the discharge flow rate from the liquid supply pump 23 is variably controlled in such a manner that the pressure in the closed tank 12 detected by the pressure sensor 73 is adjusted to an instructed pressure by the pump controller 74. Accordingly, gas to be dissolved and liquid 17 to be treated can be supplied into the closed tank 12 in a proper balance, and gas can be dissolved in liquid 17 to be treated efficiently.

Air or carbon dioxide gas is selected as gas to be dissolved, which is to be supplied to the liquid ejection space part 33 in the closed tank 12 under pressure by the gas supply units 34 and 35, by the electromagnetic gas supply valve 52 for compressed air provided in the gas supply piping 46 for compressed air and the electromagnetic gas supply valve 59 for carbon dioxide gas provided in the gas supply piping 54 for carbon dioxide gas. Air or carbon dioxide gas can be dissolved in liquid 17 to be treated efficiently, and it is possible to provide a bubble bath including microscopic bubbles or a carbonate spring.

The control unit 72 stops the liquid supply pump 23 and the pumping-up unit 27 and depressurizes the inside of the closed tank 12 with the electromagnetic depressurizing valve 75 in a static environment where the electromagnetic treated liquid taking-out valve 38 is closed, and then opens the electromagnetic treated liquid taking-out valve 38 so as to take out carbon dioxide gas solution in the closed tank 12 to the external bath 21. Accordingly, it is possible to prevent production of a significant pressure difference between before and after the flow regulator 39 at the time of taking-out of carbon dioxide gas solution to the bath 21, to prevent a rapid outgassing phenomenon of carbon dioxide gas from carbon dioxide gas solution due to a rapid pressure change, to supply carbon dioxide gas solution having a highly dissolved carbon dioxide gas concentration to the external bath 21, and to realize a highly-concentrated carbonate spring.

In addition, the present invention can be applied to a case where hydrogen gas is employed as gas to be dissolved in liquid so as to produce hydrogen water, a case where oxygen gas is adopted as gas to be dissolved in liquid so as to produce oxygen water or a case where ozone gas is adopted as gas to be dissolved in liquid so as to produce ozone water, although the foregoing description illustrates an embodiment in which compressed air and carbon dioxide gas are adopted as gas to be dissolved in liquid.

The present invention can be used in manufacturing business for manufacturing the liquid treating device 11, selling business for selling the liquid treating device 11 and the like.

The invention claimed is:

1. A method of treating liquid comprising:
providing a treatment device, the treatment device comprising:
a closed tank;
a liquid guide cylinder within the interior of the closed tank wherein the liquid guide cylinder extends in a vertical direction, wherein the liquid guide cylinder comprises a liquid suction port opened at a lower end and a liquid ejection port opened at an upper end;
a liquid supply pump;
a screw-type pump provided within the liquid guide cylinder;
gas supply piping located in an upper part of the closed tank, wherein the gas supply piping comprises a plurality of gas supply valves;
a gas-liquid separation bath formed in the closed tank below the liquid suction port of the liquid guide cylinder;
a reflux passage located between the upper part of the closed tank and an upper part of the gas-liquid separation bath; and
treated liquid removal piping comprising a liquid removal port located at a lower part of the gas-liquid separation bath,
wherein the treatment device is operated by a method comprising the steps of:
supplying liquid to be treated into the interior of the closed tank by the liquid supply pump;
suctioning a first portion of the liquid in the closed tank through the liquid suction port and ejecting the first portion of the liquid from the liquid ejection port to the upper part of the closed tank by the screw-type pump;
supplying gas to the upper part of the closed tank by the gas supply piping wherein at least a part of the gas is dissolved in the first portion of the liquid to form a gas-treated first portion of the liquid;

circuiting the gas-treated first portion of the liquid from the upper part of the closed tank through the reflux passage to the gas-liquid separation bath, wherein the gas-treated first portion of the liquid is combined with liquid within the gas-liquid separation bath to form a liquid contained in the gas-liquid separation bath;

treating the liquid contained in the gas-liquid separation bath to form a treated liquid, the treatment comprising separating gas which has not been dissolved in the liquid contained in the gas-liquid separation bath out from the liquid contained in the gas-liquid separation bath and suctioning the separated gas to the liquid guide cylinder together with a second portion of the liquid contained in the closed tank; and removing the treated liquid from the gas-liquid separation bath through the liquid removal port;

wherein the method further comprises:

detecting a liquid level in the closed tank and regulating the detected liquid level in such a manner that at least one of the plurality of gas supply valves is opened when the detected liquid level is higher than a set value and the plurality of gas supply valves is closed when the detected liquid level is lower than the set value; and detecting a pressure in the closed tank, and variably controlling a flow rate of liquid discharged from the liquid supply pump in such a manner that the detected pressure in the closed tank is maintained constant.

2. The method of treating liquid according to claim 1, wherein:

the gas supply piping is connected with a plurality of gas supply sources.

3. The method of treating liquid according to claim 2, wherein the plurality of gas supply sources comprises a compressed air supply source and a carbon dioxide gas supply source.

4. The method of treating a liquid according to claim 3, wherein the treatment device further comprises:

a treated liquid removal valve provided in the treated liquid removal piping and an external bath which is external from the closed tank, wherein the external bath is connected to the liquid removal piping such that the treated liquid removed through the liquid removal port is conveyed to the external tank by way of the liquid removal piping and liquid removal valve; and a depressurizing valve provided at an upper part of the closed tank, wherein the method further comprises the steps of:

stopping the liquid supply pump and the screw-type pump; and opening the depressurizing valve in a state where the treated liquid removal valve is closed to depressurize the inside of the closed tank, and then opening the treated liquid removal valve so as to remove carbon dioxide gas solution in the closed tank to the external bath.

* * * * *